United States Patent
Walker et al.

(10) Patent No.: US 8,419,203 B1
(45) Date of Patent: Apr. 16, 2013

(54) SINGLE CARD MULTI MODE LCD BACKLIGHT

(75) Inventors: Brian W. Walker, Cedar Rapids, IA (US); Donald E Mosier, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 421 days.

(21) Appl. No.: 12/875,707

(22) Filed: Sep. 3, 2010

(51) Int. Cl.
*G09F 13/04* (2006.01)
*G09F 13/08* (2006.01)

(52) U.S. Cl.
USPC .............. 362/97.3; 362/243; 362/249.06; 362/294; 362/373

(58) Field of Classification Search ......... 362/97.1, 362/97.2, 97.3, 294, 373, 249.02, 243, 241, 362/247, 235
See application file for complete search history.

(56) References Cited

U.S. PATENT DOCUMENTS

| | | | | |
|---|---|---|---|---|
| 5,567,036 A * | 10/1996 | Theobald et al. | | 362/485 |
| 6,076,948 A * | 6/2000 | Bukosky et al. | | 362/494 |
| 6,241,373 B1 * | 6/2001 | Kelley et al. | | 362/545 |
| 6,729,746 B2 * | 5/2004 | Suehiro et al. | | 362/241 |
| 6,814,475 B2 * | 11/2004 | Amano | | 362/487 |
| 6,876,149 B2 * | 4/2005 | Miyashita | | 313/512 |
| 6,953,265 B2 * | 10/2005 | Suehiro et al. | | 362/241 |
| 7,635,193 B2 * | 12/2009 | Chang | | 362/97.3 |
| 7,654,689 B2 * | 2/2010 | Chang | | 362/248 |
| 7,670,020 B2 * | 3/2010 | Chang | | 362/97.1 |
| 7,677,749 B2 * | 3/2010 | Chang et al. | | 362/97.1 |
| 7,717,587 B2 * | 5/2010 | Lin et al. | | 362/249.06 |
| 7,850,353 B2 * | 12/2010 | Ota et al. | | 362/545 |
| 7,878,680 B2 * | 2/2011 | Fujino et al. | | 362/231 |
| 7,980,717 B2 * | 7/2011 | Kim et al. | | 362/97.2 |
| 8,157,430 B2 * | 4/2012 | Hamada | | 362/613 |
| 8,313,206 B2 * | 11/2012 | Ing et al. | | 362/97.3 |

* cited by examiner

*Primary Examiner* — John A Ward

(74) *Attorney, Agent, or Firm* — Donna P. Suchy; Daniel M. Barbieri

(57) ABSTRACT

An light emitting diode (LED) assembly may include, but is not limited to: a printed circuit board comprising at least one aperture; a first LED mounted on a front surface of the printed circuit board; a second LED mounted on a rear surface of the printed circuit board; and a reflective surface configured to reflect light emitted by the second LED through the at least one aperture.

18 Claims, 4 Drawing Sheets

SINGLE CARD MULTI MODE LCD BACKLIGHT

BACKGROUND

Modern displays units may incorporate liquid crystal display (LCD) units which are illuminated by light emitting diode (LED) assemblies. Such LED assemblies may produce light suitable for daylight or nighttime operations. However, various platforms (e.g. avionics displays, automobile displays) employing such displays may be operated in varying light levels, with different spectral output characteristics for each level. As such, it may be desirable to provide an LED assembly capable of such multi-mode operation.

SUMMARY

A light emitting diode (LED) backlight assembly may include, but is not limited to: a printed circuit board comprising at least one aperture; a first LED mounted on a front surface of the printed circuit board; a second LED mounted on a rear surface of the printed circuit board; and a reflective surface configured to reflect light emitted by the second LED through the at least one aperture.

BRIEF DESCRIPTION OF THE DRAWINGS

The disclosure will become more fully understood from the following detailed description, taken in conjunction with the accompanying drawings, wherein like reference numerals refer to like elements, in which Figure Reference No:

1 illustrates an LED cell;
2 illustrates a display assembly;
3 illustrates an LED cell;
4 illustrates a display assembly.

DETAILED DESCRIPTION

Figure 1:
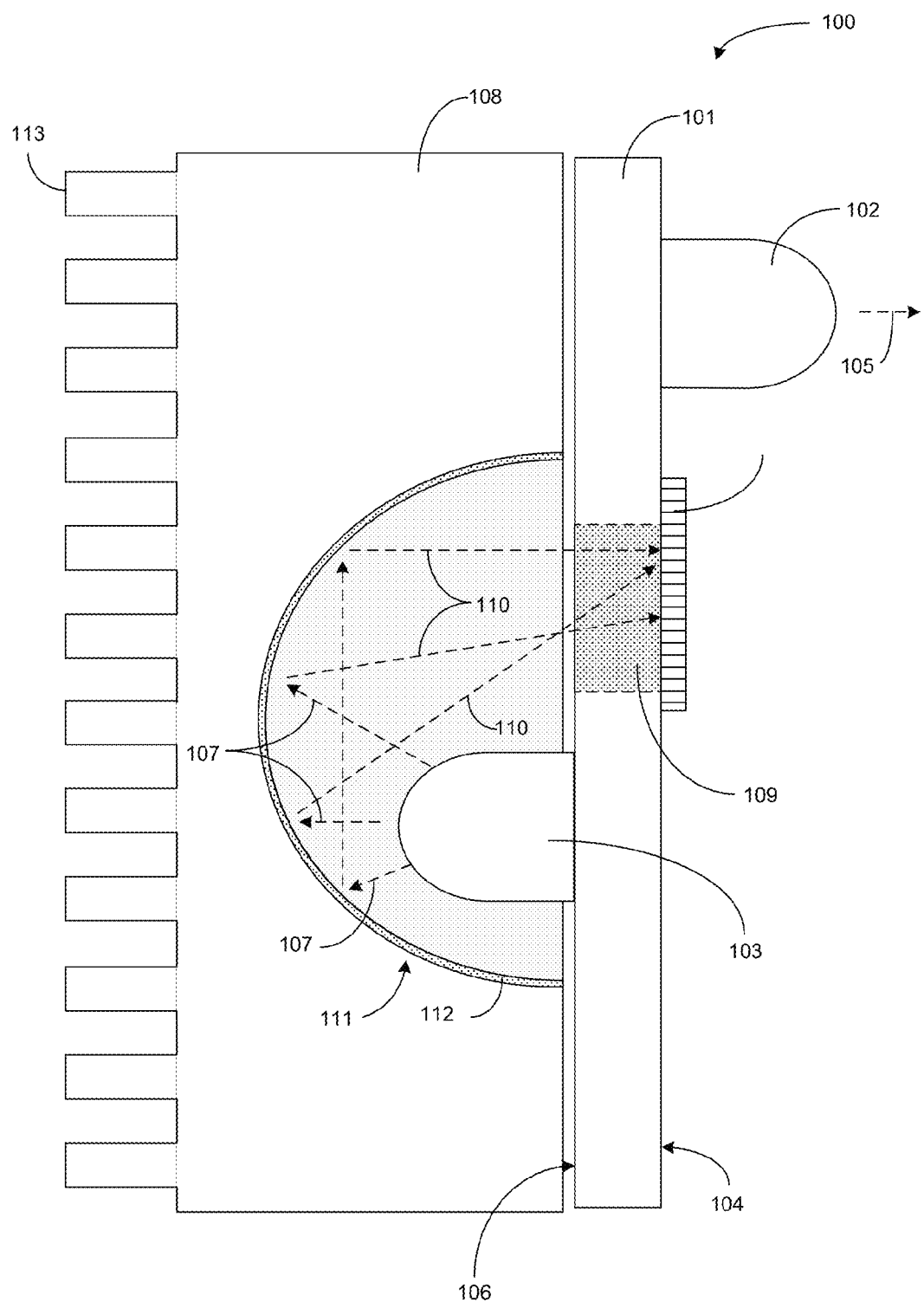

Before describing in detail the particular improved system and method, it should be observed that the invention may include, but may be not limited to a novel structural combination of conventional data/signal processing components and circuits, and not in the particular detailed configurations thereof. Accordingly, the structure, methods, functions, control and arrangement of conventional components, software, and circuits have, for the most part, been illustrated in the drawings by readily understandable block representations and schematic diagrams, in order not to obscure the disclosure with structural details which will be readily apparent to those skilled in the art, having the benefit of the description herein. Further, the invention may be not limited to the particular embodiments depicted in the exemplary diagrams, but should be construed in accordance with the language in the claims.

Referring to FIG. 1, a multi-mode LED cell 100 is shown. The LED cell 100 may include a printed circuit board 101, a front-side LED 102, and a back-side LED 103. The front-side LED 102 may be mounted to a first surface 104 of the printed circuit board 101 such that light 105 emitted by the front-side LED 102 is directed substantially away from the first surface 104. The back-side LED 103 may be mounted to a second surface 106 of the printed circuit board 101 such that light 107 emitted by the back-side LED 103 is directed substantially away from the second surface 106. The LED cell 100 may be characterized as a multi-mode LED cell 100 in that a controller unit (not shown) may selectively illuminate either the front-side LED 102 or the back-side LED 103 depending on ambient lighting conditions (e.g. daytime use or nighttime use). The front-side LED 102 may be configured to provide high luminance, unfiltered light for day mode operation and the back-side LED 103 may provide lower luminance, filtered light for night mode operation.

The front-side LED 102 may be surface mounted and may include white, red, green and/or blue LEDs. The front-side LED 102 may be high power with currents of 20 mA to one amp or more. The back-side LED 103 may be lower power (<50 mA) and may be white, red, green or blue. Use of blue LEDs may not require very long wavelength (VLW) filtering for night vision imaging system (NVIS) applications.

The LED cell 100 may include a reflective plate 108. The reflective plate 108 may be configured to reflect light 107 emitted by the back-side LED 103 back toward the printed circuit board 101. The reflective plate 108 may be, for example, an aluminum plate.

The printed circuit board 101 may include an aperture 109 that may allow reflected light 110 reflected by the reflective plate 108 to pass through the printed circuit board 101 and exit from the first surface 104. The reflective plate 108 may include a surface 111 that is at least partially indented relative to the primary plane of the reflective plate. The surface 111 may be configured to reflect the emitted light 107 toward the aperture 109. The surface 111 may be created in the reflective plate 108 by milling or casting of the reflective plate 108. The surface 111 may be sized such that it may be simultaneously be disposed over the back-side LED 103 and the aperture 109 when the reflective plate 108 is mated with the printed circuit board 101. The reflective plate 108 may be a non-imaging reflective plate 108 where various features of the surface 111 are configured to optimize the concentration and/or distribution of reflected light 110 at the aperture 109. For example, the geometries of the surface 111 may be such that light 107 incident at a given point on the surface 111 may be directed toward the aperture 109. The surface 111 may be at least partially hemispheric, ovoidal, cylindrical, conical, cubic or any other shape. The surface 111 may be faceted such that one or more facets, alone or in combination, serve to reflect light 107 incident on the facets towards the aperture 109. The surface 111 may further include a reflective coating 112 (e.g. a white paint or a fluorocarbon polymer coating) to maximize the amount of reflected light 110 transmitted toward the printed circuit board 101.

In addition to serving as a reflective surface for reflecting light 107, the reflective plate 108 may serve the secondary purpose of providing a heat sink away from the printed circuit board 101. The reflective plate 108 may be physically mated to the printed circuit board 101 to allow for heat transfer away from the printed circuit board 101. Additionally, the reflective plate 108 may include a heat transfer mechanism (e.g. fins 113) which may enhance heat dissipation.

The LED cell 100 may include a night vision imaging system (NVIS) filter 114. The filter may serve to reduce or eliminate the transmission of very-long wavelength (VLW) components of the reflected light 110 so as to enable compatibility with low-light imaging systems (e.g. night-vision goggles). Very long wavelength filters may include an absorbing plastic construction composed of multilayer dielectric interference stacks deposited on glass substrates. The filter 114 may be disposed substantially over the aperture 109 to modify the optical properties of the reflected light 110 emitted from the aperture 109.

Figure 2:
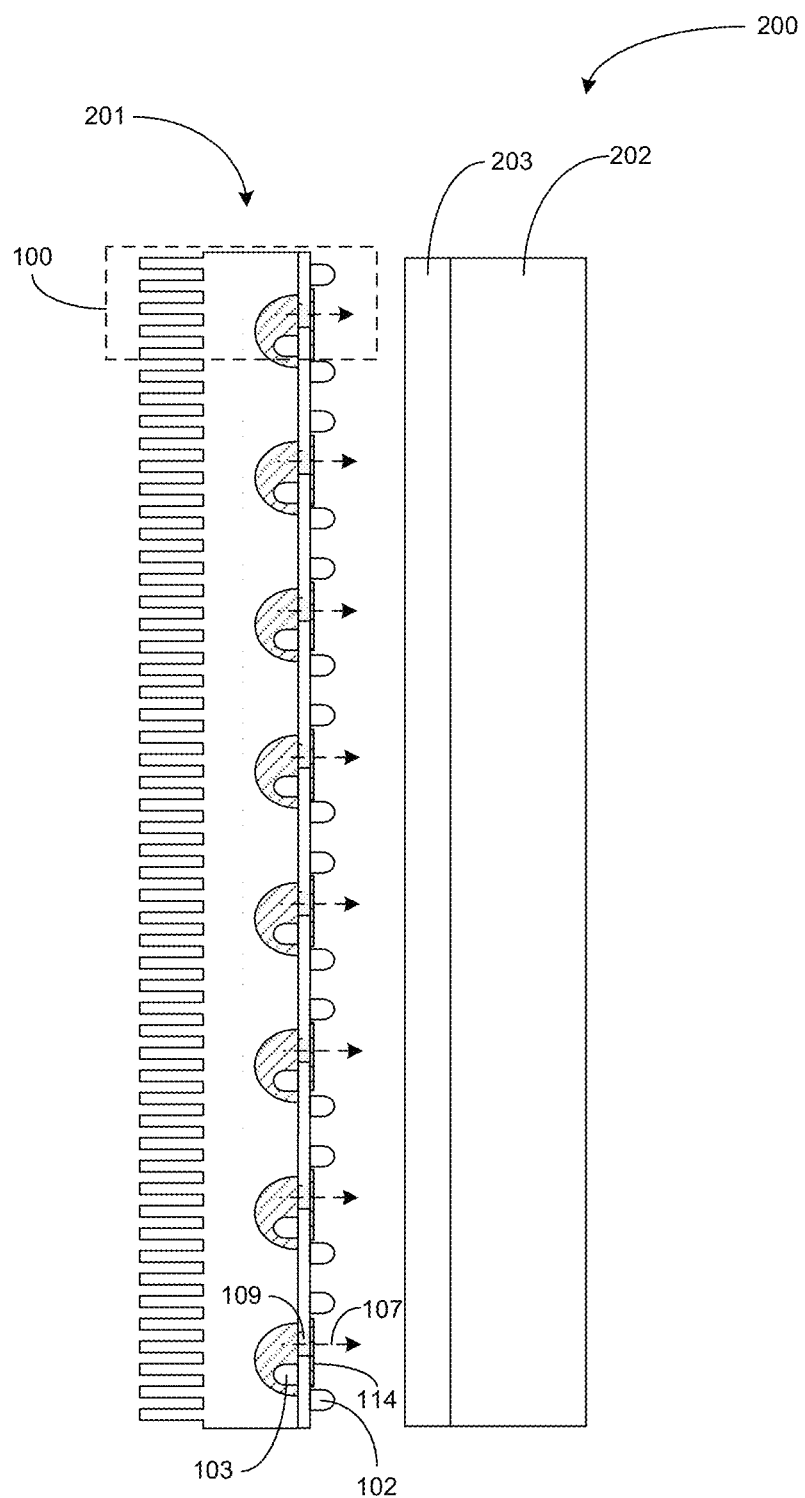

Referring to FIG. 2, a multi-mode display 200 is illustrated. The display 200 may include a multi-mode LED assembly 201 and a transmissive display assembly 202. The LED assembly 201 may include an array of multi-mode LED cells 100 as described above. The transmissive display assembly 202 (e.g. a transmissive electro-optical device such as a liquid crystal display, an electrophoretic display, a suspended particle display, electrochromic display, and the like) may be configured to display an image upon the application of light by the LED assembly 201.

The filter 114 may be dedicated to a back-side LED 103 in that the filter 114 filters only reflected light 110 associated with the back-side LED 103 while having no filtering affects on any other light emitting elements (e.g. the front-side LED 102). The filter 114 may be a single filter element associated with a single back-side LED 103 and aperture 109. The optical properties of the filter 114 may vary over the surface of the LED assembly 201. For example, in the case of a single filter element associated with a single back-side LED 103, the filter 114 may be specified for that back-side LED 103 (e.g. according to the LED color, desired viewing angle, desired polarization, spectral characteristics, and the like).

Alternately, the filter 114 may be a larger filter layer that may cover closely oriented and co-located apertures 109. As referenced above, the optical properties of the filter 114 may vary over the surface of the LED assembly 201. In the case of a larger filter layer covering more than one aperture 109, the composition or structure of the layer may be non-homogenous such that various regions may be specified for different back-side LEDs 103.

The filter 114 may be disposed within the aperture 109 (not shown) and affixed in position with an adhesive or a reflective film disposed about the walls of the aperture 109 to prevent shifting of the filter 114 with respect to the aperture 109.

The transmissive display assembly 202 may include a secondary filter layer 203 (e.g. polarizers, compensators, optical enhancement films and/or cover glass). The secondary filter may serve to enhances basic NVIS performance with little impact to performance of day mode LEDs, redirects light propagation direction, or improve uniformity.

Figure 3:
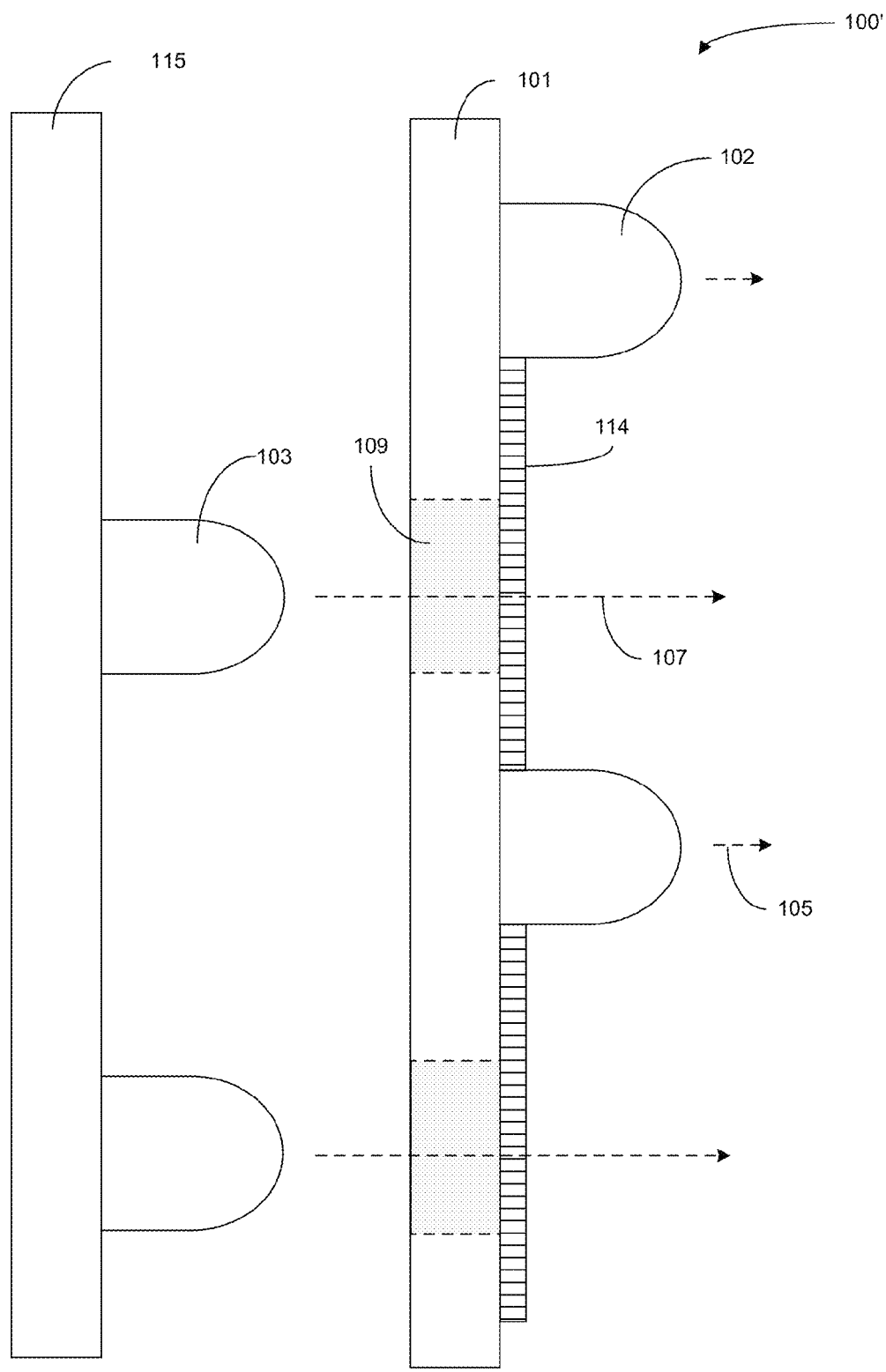

Referring to FIG. 3, an alternate configuration of a LED cell 100' is shown. The LED cell 100' may include a first printed circuit board 101, a front-side LED 102, a second circuit board 115; and a back-side LED 103. The front-side LED 102 may be mounted to a first surface 104 of the first printed circuit board 101 such that light 105 emitted by the front-side LED 102 is directed substantially away from the first surface 104. The back-side LED 103 may be mounted to second circuit board 115 such that light 107 emitted by the back-side LED 103 is directed substantially toward a the second surface 106 of the first printed circuit board 101. The LED cell 100' may be characterized as a multi-mode LED cell 100' in that a controller unit (not shown) may selectively illuminate either the front-side LED 102 or the back-side LED 103 depending on ambient lighting conditions (e.g. daytime use or nighttime use). The front-side LED 102 may be configured to provide high luminance, unfiltered light for day mode operation and the back-side LED 103 may provide lower luminance, filtered light for night mode operation.

The front-side LED 102 may be surface mounted and may include white, red, green and/or blue LEDs. The front-side LED 102 may be high power with currents of 20 mA to one amp or more. The back-side LED 103 may be lower power (<50 mA) and may be white, red, green or blue. Use of blue LEDs may not require very long wavelength (VLW) filtering for night vision imaging system (NVIS) applications. The printed circuit board 101 may include an aperture 109 that may allow light 107 emitted by the back-side LED 103 to pass through the printed circuit board 101 and exit from the first surface 104.

The LED cell 100' may include a night vision imaging system (NVIS) filter 114. The filter 114 may serve to reduce or eliminate the transmission of very-long wavelength (VLW) components of the light 107 so as to enable compatibility with low-light imaging systems (e.g. night-vision goggles). The filter may be polymeric in nature and/or utilize dielectric evaporative coatings. The filter 114 may be disposed substantially over an aperture 109 to modify the optical properties of the light 107 emitted from the aperture 109.

Figure 4:
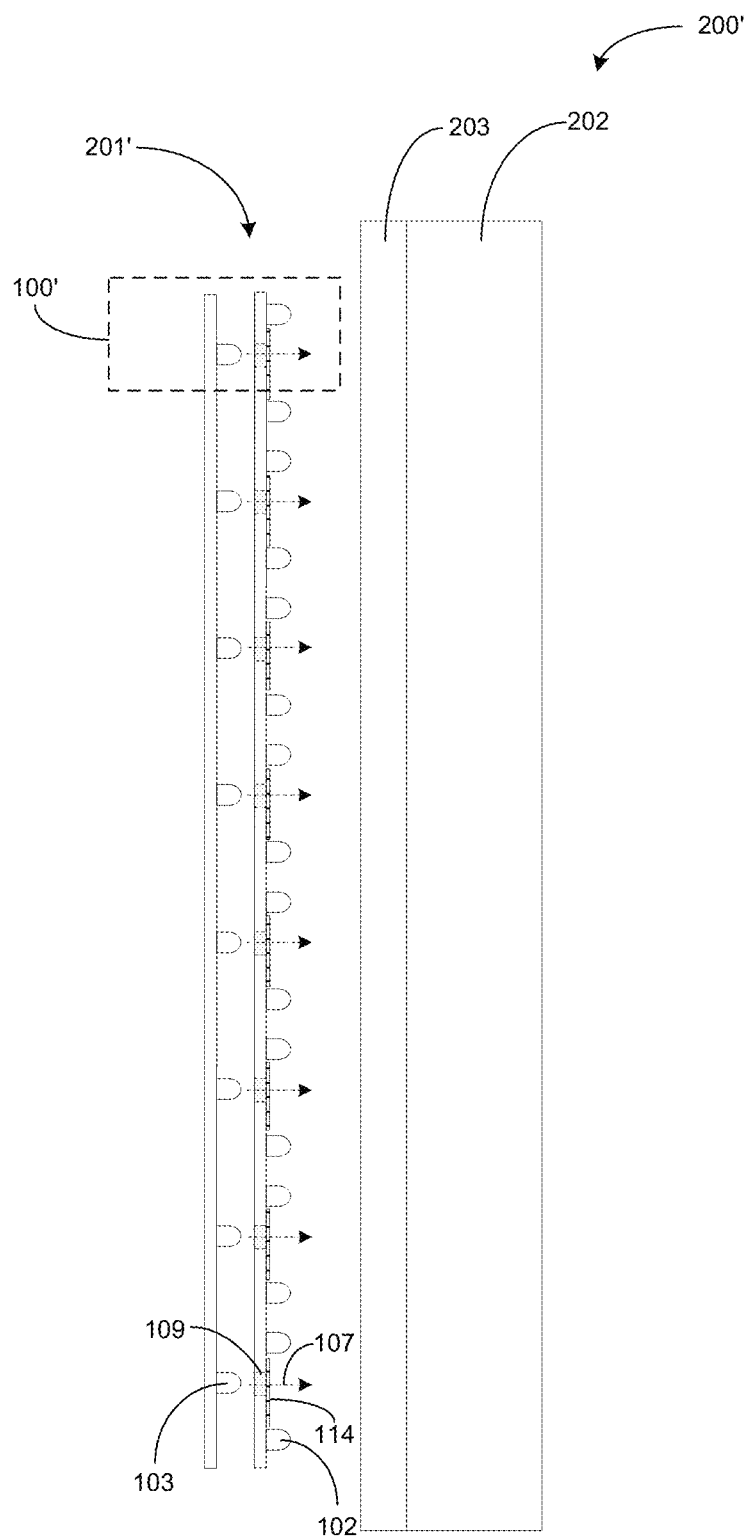

Referring to FIG. 4, an alternate configuration of a multi-mode display 200' is illustrated. The display 200' may include a LED assembly 201' and a transmissive display assembly 202. The LED assembly 201' may include an array of multi-mode LED cells 100' as described above with respect to FIG. 3. The transmissive display assembly 202 (e.g. a transmissive electro-optical device such as a liquid crystal display, an electrophoretic display, a suspended particle display, electrochromic display, and the like) may be configured to display an image upon the application of light by the LED assembly 201'.

The filter 114 may be dedicated to a back-side LED 103 in that the filter 114 filters only light 107 associated with the back-side LED 103 while having no filtering affects on any other light emitting elements (e.g. the front-side LED 102). The filter 114 may be a single filter element associated with a single back-side LED 103 and aperture 109. The optical properties of the filter 114 may vary over the surface of the LED assembly 201'. For example, in the case of a single filter element associated with a single back-side LED 103, the filter 114 may be specified for that back-side LED 103 (e.g. according to the LED color, desired viewing angle, desired polarization and the like).

Alternately, the filter 114 may be a larger filter layer that may cover closely oriented and co-located apertures 111. As referenced above, the optical properties of the filter 114 may vary over the surface of the LED assembly 201'. In the case of a larger filter layer covering more than one aperture 109, the composition or structure of the layer may be non-homogenous such that various regions may be specified for different back-side LEDs 103.

The filter 114 may be disposed within the aperture 109 (not shown) and affixed with an adhesive or a reflective film disposed about the walls of the aperture 109 to prevent shifting of the filter 114 with respect to the aperture 109.

The transmissive display assembly 202 may include a secondary filter layer 203 (e.g. polarizers, compensators, optical enhancement films and/or cover glass). The secondary filter may be used to further enhance night vision performance in night mode with minimal impact on day mode color and viewing characteristics.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms. For example, the phrase "A or B" will be typically understood to include the possibilities of "A" or "B" or "A and B."

Although specific dependencies have been identified in the claims, it is to be noted that all possible combinations of the features of the claims are envisaged in the present application, and therefore the claims are to be interpreted to include all possible multiple dependencies. It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

Although particular embodiments of this invention have been illustrated, it is apparent that various modifications and embodiments of the invention may be made by those skilled in the art without departing from the scope and spirit of the foregoing disclosure. Accordingly, the scope of the invention should be limited only by the claims appended hereto.

What is claimed is:

1. An light emitting diode (LED) assembly comprising:
    a printed circuit board comprising at least one aperture;
    a first LED mounted on a front surface of the printed circuit board;
    a second LED mounted on a rear surface of the printed circuit board; and
    a reflective surface configured to reflect light emitted by the second LED through the at least one aperture.

2. The LED assembly of claim 1, wherein the first LED and the second LED are oriented in substantially opposite directions.

3. The LED assembly of claim 1, further comprising:
    a filter.

4. The LED assembly of claim 3, wherein the filter is disposed in a position to condition light emitted from the at least one aperture.

5. The LED assembly of claim 4, wherein the filter is configured to at least partially remove at least a very-long wavelength component of light emitted from the at least one aperture.

6. The LED assembly of claim 4, wherein the aperture comprises a reflective coating.

7. The LED assembly of claim 1, wherein the reflective surface comprises:
    at least one indention in the reflective surface.

8. The LED assembly of claim 7, wherein the at least one indention comprises:
    at least one of: an at least partially concave indention; an at least partially hemispherical indention; an at least partially ovoidal indention; an at least partially cubic indention; an at least partially conical indention; and an at least partially cylindrical indention.

9. The LED assembly of claim 7, wherein the at least one indention comprises at least one faceted surface.

10. The LED assembly of claim 7, wherein the at least one indention comprises a reflective coating.

11. The LED assembly of claim 1, wherein the reflective surface comprises:
    at least one mechanism for sinking heat from the printed circuit board.

12. A display assembly comprising:
    a transmissive imaging assembly; and
    a light emitting diode (LED) assembly comprising:
        a printed circuit board comprising at least one aperture;
        a first LED mounted on a front surface of the printed circuit board;
        a second LED mounted on a rear surface of the printed circuit board; and
        a reflective surface configured to reflect light emitted by the second LED through the at least one aperture.

13. The display assembly of claim 12, further comprising:
    a filter.

14. The display assembly of claim 13, wherein the filter is disposed in a position to condition light emitted from the at least one aperture.

15. The display assembly of claim 12, wherein the reflective surface comprises:
    at least one indention in the reflective surface.

16. The display assembly of claim 12, wherein the reflective surface comprises:
    at least one mechanism for sinking heat from the printed circuit board.

17. The display assembly of claim 12, further comprising:
    a secondary filter disposed between the LED assembly and the transmissive imaging assembly.

18. A method of illuminating a display assembly comprising:
    providing a transmissive display assembly;

providing a light emitting diode (LED) assembly comprising:
- a printed circuit board comprising at least one aperture;
- a first LED mounted on a front surface of the printed circuit board;
- a second LED mounted on a rear surface of the printed circuit board; and
- a reflective surface configured to reflect light emitted by the second LED through the at least one aperture;

operating the LED assembly in a first mode by powering the first LED to illuminate the transmissive display assembly; and operating the LED assembly in a second mode by powering the second LED to illuminate the transmissive display assembly via light reflected from the reflective surface through the at least one aperture.

* * * * *